US012691552B1

(12) United States Patent
Liu

(10) Patent No.: US 12,691,552 B1
(45) Date of Patent: Jul. 28, 2026

(54) MULTI-FUNCTIONAL DOUBLE-ENDED SOCKET AND MAGNETIC EXTENSION BAR KIT WITH C-SHAPE RETAINING RINGS

(71) Applicant: Hui Liu, Pingxiang City (CN)

(72) Inventor: Hui Liu, Pingxiang City (CN)

( * ) Notice: Subject to any disclaimer, the term of this patent is extended or adjusted under 35 U.S.C. 154(b) by 0 days.

(21) Appl. No.: 19/394,937

(22) Filed: Nov. 20, 2025

(30) Foreign Application Priority Data

Oct. 10, 2025 (CN) ......................... 202522137525.6

(51) Int. Cl.
*B25B 13/06* (2006.01)
*B25B 23/00* (2006.01)
*B25B 23/12* (2006.01)

(52) U.S. Cl.
CPC .......... *B25B 13/06* (2013.01); *B25B 23/0021* (2013.01); *B25B 23/0035* (2013.01); *B25B 23/12* (2013.01)

(58) Field of Classification Search
CPC ............ B25B 23/0021; B25B 23/0035; B25B 23/005; B25B 23/02; B25B 23/08; B25B 23/10; B25B 23/108; B25B 23/12; B25B 13/06; B25B 13/065
USPC ............................................................ 81/125
See application file for complete search history.

(56) References Cited

U.S. PATENT DOCUMENTS 2,805,594 A * 9/1957 Fogel .................... B25B 23/108 81/125
3,142,211 A * 7/1964 Faso ..................... B25B 23/108 81/125
4,947,713 A * 8/1990 Arnold .................... B25B 13/06 81/184
4,982,627 A * 1/1991 Johnson ................ B23B 31/005 81/177.1
5,048,379 A * 9/1991 Gramera ................. B25B 13/06 81/121.1
5,470,180 A * 11/1995 Jore .......................... B25F 3/00 408/239 R
5,819,606 A * 10/1998 Arnold .................... B25B 13/06 81/DIG. 5
5,916,340 A * 6/1999 Forsyth ................... B25B 23/12 81/125
5,954,463 A * 9/1999 Jore ........................ B25B 23/00 81/439
5,957,012 A * 9/1999 McCune ............. B25B 23/0035 81/185

(Continued)

*Primary Examiner* — David B. Thomas
(74) *Attorney, Agent, or Firm* — Nicholas Makridakis

(57) ABSTRACT

The present disclosure discloses a multi-functional double-ended socket and magnetic extension bar kit with C-type retaining rings. A socket body is formed as a hollow cylinder from S2 tool steel or chrome vanadium steel, and has a socket end H8 and a socket end H10 integrally formed at two axial ends; a central internal hexagonal through hole is formed in a middle portion of the socket body; retaining ring grooves and auxiliary round holes are milled in an internal hexagonal edge of each of the two socket ends; and yellow-painted and blue-painted grooves for specification identification are correspondingly formed in an outer wall of the socket body. An NdFeB magnetic head is embedded into an H1/4 shank of a magnetic extension bar with a detent ball, and a detent ball groove and a driving end detent ball are disposed on a peripheral surface of the magnetic extension bar.

7 Claims, 3 Drawing Sheets

(56) References Cited

U.S. PATENT DOCUMENTS 5,992,274 A * 11/1999 Lammers ................ B25B 23/08
81/451
6,082,227 A * 7/2000 Vogel ...................... B25B 13/56
81/DIG. 5
6,176,654 B1 * 1/2001 Jore .................... B23B 31/1071
408/239 R
6,257,098 B1 * 7/2001 Cirone ...................... G09F 3/00
81/DIG. 5
6,393,950 B1 * 5/2002 Crosser ................... B25B 13/56
81/177.1
6,450,479 B1 * 9/2002 Reynolds ............... B25G 1/005
251/291
6,701,809 B2 * 3/2004 Huang .................... B25B 23/12
403/DIG. 1
7,117,765 B1 * 10/2006 Wallden ................... B25G 1/00
81/60
7,434,494 B1 * 10/2008 Snider ................... B25B 13/102
81/177.4
7,895,724 B1 * 3/2011 Dugan .................... B25B 13/56
29/458
9,592,594 B2 * 3/2017 Chen ................... B25B 23/0035
9,981,366 B2 * 5/2018 Todd ....................... B25B 23/12
10,328,554 B2 * 6/2019 Todd ....................... B25B 23/12
10,406,657 B2 * 9/2019 Marovets ................ B25B 13/08
10,442,059 B2 * 10/2019 Milligan ............. B25B 23/0035
10,675,739 B2 * 6/2020 Miley ..................... B25B 23/12
12,415,257 B2 * 9/2025 Minor ................... B25B 13/065
12,459,087 B2 * 11/2025 Santamarina ........... B25B 13/06
2004/0163500 A1 * 8/2004 Walsh ................... B25B 23/108
81/125
2006/0236822 A1 * 10/2006 Nish ..................... B25B 23/108
81/125
2006/0266163 A1 * 11/2006 Crosser ................... B25B 13/56
81/119
2007/0044596 A1 * 3/2007 Chen ................... B25B 23/0035
81/125
2009/0095137 A1 * 4/2009 McKee ................. B25B 13/065
81/121.1
2010/0116098 A1 * 5/2010 Kuo ...................... B25B 15/001
81/121.1
2014/0196578 A1 * 7/2014 Milligan ................. B25B 23/00
81/124.6
2014/0311302 A1 * 10/2014 Taguchi .............. B25B 23/0035
81/125
2019/0009392 A1 * 1/2019 Violette .................. B25B 15/02
2022/0097216 A1 * 3/2022 Hsieh .................. B25B 23/0035
2023/0140562 A1 * 5/2023 Santamarina ....... B25B 23/0035
81/124.4

* cited by examiner

MULTI-FUNCTIONAL DOUBLE-ENDED SOCKET AND MAGNETIC EXTENSION BAR KIT WITH C-SHAPE RETAINING RINGS

TECHNICAL FIELD

The present disclosure provides a double-ended socket and magnetic extension bar kit, and particularly relates to a multi-functional double-ended socket and magnetic extension bar kit with C-shape retaining rings.

BACKGROUND

In mechanical assembly, equipment maintenance, automotive repair, and home appliance assembly scenarios, a plurality of tools are usually required to be used in combination to complete tightening, positioning, and anti-loosening operations of an external hexagon screw or nut. Relevant core tools include a socket, a magnetic extension bar, C-shape retaining ring pliers, and an internal hexagonal driving bar. Specifically, the socket achieves a tightening action through cooperation between the screw/nut and an inner hole of a matching specification; the magnetic extension bar assists in screw pickup/placement and initial positioning by attracting a metallic or stainless steel screw through magnetism; the C-shape retaining ring pliers are configured to install a C-shape retaining ring to clamp a non-metallic or non-magnetic screw so as to prevent the screw from falling off during assembly; and the internal hexagonal driving bar, acting as a power transmission component, cooperates with the socket to drive the socket to rotate, thereby meeting the power input requirements of different operation scenarios.

In the prior art, the above tools generally have deficiencies of dispersed functions and low integration. The basic structures and shortcomings are specifically as follows: Firstly, an ordinary double-ended socket has inner holes with different specifications (such as H8 and H10) only at both ends, and lacks magnetic attraction, retaining ring installation, and central hole driving structures. The socket requires use with a separate wrench or driving bar, and frequent tool switching leads to low operational efficiency. Secondly, a magnetic extension bar in the prior art usually has a single magnetic attraction structure, only attracts a metallic screw, and is not applicable to a non-metallic or non-magnetic stainless steel screw. Furthermore, the extension bar lacks an axial limiting structure, and is prone to detachment when cooperating with an external tool. Thirdly, a C-shape retaining ring is installed by a separate tool, the retaining ring installation function is not integrated into the socket, additional tools need to be carried, and frequent tool switching is required during use. Fourthly, the socket in the prior art has no central internal hexagonal through hole, the internal hexagonal driving bar drives the socket only from one direction and relies on a swing space for a wrench handle, and a normal operation is unavailable in an extremely confined space. Fifthly, the socket in the prior art is usually made from ordinary steel through a simple heat treatment process, resulting in insufficient strength and wear resistance. In addition, there are no intuitive specification identification markings, easily leading to confusion between different socket specifications. Sixthly, no auxiliary structure is available for installation and removal of the C-shape retaining ring, and the operation is inconvenient. The above shortcomings result in the problems of a tool combination in the prior art, such as carrying of a plurality of tools, cumbersome switching, easy detachment of a screw, poor adaptability in a confined space, and short service life, such that it is difficult for the tool combination to meet efficient and safe assembly requirements.

SUMMARY

In view of the problems in the prior art, such as dispersed functions, low integration, limited operation in a confined space, easy detachment of a screw, non-intuitive specification identification, inconvenient operation of a C-shape retaining ring, and insufficient material strength, the present disclosure provides a multi-functional double-ended socket and magnetic extension bar kit with C-shape retaining rings, which achieves multi-functional integration, adaptation to a confined space, screw falling prevention, easy specification identification, and improved durability.

To solve the above technical problems, the present disclosure provides the following technical solution: A multi-functional double-ended socket and magnetic extension bar kit with C-shape retaining rings includes a socket body, a magnetic extension bar with a detent ball, an H8-end C-shape retaining ring, and an H10-end C-shape retaining ring; where

- the socket body is in a hollow cylindrical shape and is made from chrome vanadium steel or S2 alloy steel through a quenching and tempering heat treatment, with a hardness after heat treatment of up to HRC 45-50 to ensure sufficient strength and wear resistance; two axial ends of the socket body are integrally formed with a socket end H8 and a socket end H10, respectively, an internal specification of the socket end H8 is H8, an internal specification of the socket end H10 is H10, and the socket end H8 and the socket end H10 are configured to tighten metallic external hexagon screws, non-metallic external hexagon screws, or external hexagon nuts of different specifications; and an H8-end yellow-painted groove for specification identification is formed in an outer wall of the socket body corresponding to the socket end H8, and an H10-end blue-painted groove for specification identification is formed in an outer wall of the socket body corresponding to the socket end H10, and these painted grooves are configured to intuitively identify the specifications of the two socket ends;
- a central internal hexagonal through hole H8 is radially formed in a middle portion of the socket body, a specification of the central internal hexagonal through hole H8 is H8, the central internal hexagonal through hole H8 penetrates through two side walls of the socket body, the central internal hexagonal through hole H8 is adapted to an H8-size internal hexagonal driving bar, and the H8-size internal hexagonal driving bar is inserted into the central internal hexagonal through hole H8 from either a socket end H8 side or a socket end H10 side of the socket body, to drive the socket body to rotate;
- the magnetic extension bar with the detent ball includes an H1/4 shank, a magnetic head, a detent ball groove, and a driving end detent ball, where a tail portion of the H1/4 shank is configured to connect a power tool or a pneumatic tool, to drive the socket body to rotate through the electric tool or the pneumatic tool; the magnetic head is made from an NdFeB strong magnet with dimensions of 5×4.5 mm, the magnetic head is embedded into an end portion of the H1/4 shank distal from the tail portion by an interference fit, an end surface of the magnetic head is flush with an end surface of the H1/4 shank at the end where the magnetic head is located, and the magnetic head is configured to attract and fix a metallic external hexagon screw or a stainless steel external hexagon screw, to facilitate screw pickup/placement and initial positioning; and the detent ball groove is formed in a peripheral surface of a bar body between the H1/4 shank and the magnetic head, the driving end detent ball is movably embedded in the detent ball groove, and configured to achieve an axial limitation when the magnetic extension bar with the detent ball cooperates with an external tool or the socket body, to prevent the magnetic extension bar with the detent ball from detaching from the cooperating component; and two H8-end retaining ring grooves are formed in a face of an internal hexagonal edge of the socket end H8, one H8-end retaining ring groove round hole is correspondingly formed beside each H8-end retaining ring groove, the H8-end retaining ring groove round hole is communicated with the corresponding H8-end retaining ring groove, and a diameter of the H8-end retaining ring groove round hole is larger than a width of the H8-end retaining ring groove; two H10-end retaining ring grooves are formed in a face of an internal hexagonal edge of the socket end H10, one H10-end retaining ring groove round hole is correspondingly formed beside each H10-end retaining ring groove, the H10-end retaining ring groove round hole is communicated with the corresponding H10-end retaining ring groove, and a diameter of the H10-end retaining ring groove round hole is larger than a width of the H10-end retaining ring groove; a size of the H8-end retaining ring groove matches a size of the H8-end C-shape retaining ring, a size of the H10-end retaining ring groove matches a size of the H10-end C-shape retaining ring, the H8-end C-shape retaining ring is correspondingly snapped in the H8-end retaining ring groove, the H10-end C-shape retaining ring is correspondingly snapped in the H10-end retaining ring groove, opening directions of both the H8-end C-shape retaining ring and the H10-end C-shape retaining ring face a central axis of the socket body, and the H8-end C-shape retaining ring and the H10-end C-shape retaining ring are configured to clamp a metallic external hexagon screw, a non-metallic external hexagon screw, or a stainless steel external hexagon screw to prevent the screw from falling off; and the H8-end retaining ring groove round hole and the H10-end retaining ring groove round hole are configured to assist in installation and removal operations of the H8-end C-shape retaining ring and the H10-end C-shape retaining ring.

One or more technical solutions provided in the embodiments of the present disclosure, compared with the prior art, at least have the following technical effects or advantages:

A. High functional integration: The kit integrates the functions of two socket specifications, central hole driving, a magnetic extension bar, and C-shape retaining ring installation, replaces a plurality of conventional tools, and significantly improves operational efficiency without frequent switching.

B. Strong adaptability in a confined space: The H8-size internal hexagonal driving bar is inserted into the central internal hexagonal through hole to drive the socket body to rotate, which does not require a swing space for a conventional wrench handle, and enables a normal operation in an extremely confined space.

C. Safe and efficient operation: The magnetic head is capable of attracting a metallic or stainless steel screw, while the H8-end C-shape retaining ring and the H10-end C-shape retaining ring are capable of clamping a non-metallic or non-magnetic screw. This dual anti-drop structure reduces the risks of screw falling off. The driving end detent ball achieves an axial limitation for the magnetic extension bar, and prevents detachment during cooperation.

D. Intuitive specification identification and convenient operation: The H8 -end yellow-painted groove for specification identification and the H10-end blue-painted groove for specification identification allow for quick identification of socket specifications. The H8-end retaining ring groove round hole and the H10-end retaining ring groove round hole assist in installation and removal of C-shape retaining rings, and reduce operational difficulty.

E. Robust and durable structure: The socket body is made from chrome vanadium steel or S2 alloy steel through a quenching and tempering heat treatment, with a hardness of up to HRC 45-50, thereby providing an excellent deformation resistance, a high strength, and a superior wear resistance, and extending the service life of the tool.

Other advantages, objectives, and features of the present disclosure will be elaborated in the following description to some extent, and will be apparent to those skilled in the art from the investigation and study of the following description to some extent, or may be learned from the practice of the present disclosure.

Figure 1:
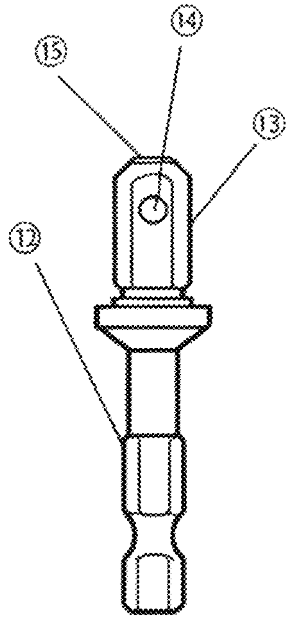
FIG. 1 is a schematic perspective view of a magnetic extension bar of a multi-functional double-ended socket and magnetic extension bar kit with C-shape retaining rings according to the present disclosure.

Reference numerals in the figures:

1—socket body; 2—socket end H8; 3—socket end H10; 4—central internal hexagonal through hole H8; 5—detent ball groove; 6—H8-end retaining ring groove; 7—H 10-end retaining ring groove; 8—H8-end retaining ring groove round hole; 9—H10 -end retaining ring groove round hole; 10—H8-end C-shape retaining ring; 11—H10-end C-shape retaining ring; 12—magnetic extension bar with a detent ball; 13—H8-size internal hexagonal driving bar; 14—driving end detent ball; 15—magnetic head; 16—H8 -end yellow-painted groove for specification identification; and 17—H10-end blue-painted groove for specification identification.

DETAILED DESCRIPTION OF PREFERRED EMBODIMENTS

The technical solutions in embodiments of the present disclosure will be clearly and completely described below in combination with the drawings in embodiments of the present disclosure. It is obvious that the described embodiments are only a part of, rather than all of, the embodiments of the present disclosure. On the basis of the embodiments in the present disclosure, all other embodiments obtained by those of ordinary skill in the art without making creative efforts will fall within the protection scope of the present disclosure.

It should be stated that terms "vertical", "horizontal", "upper", "lower", "left", "right", and the like used herein are for illustrative purposes only and do not represent the only implementation.

Unless otherwise defined, all technical and scientific terms used herein have the same meanings as commonly understood by those skilled in the art to which the present disclosure belongs. The terms used in the specification of the present disclosure are merely for the purpose of describing specific embodiments and are not intended to limit the present disclosure. The term "and/or" used herein includes any and all combinations of one or more of relevant listed items.

Figure 2:
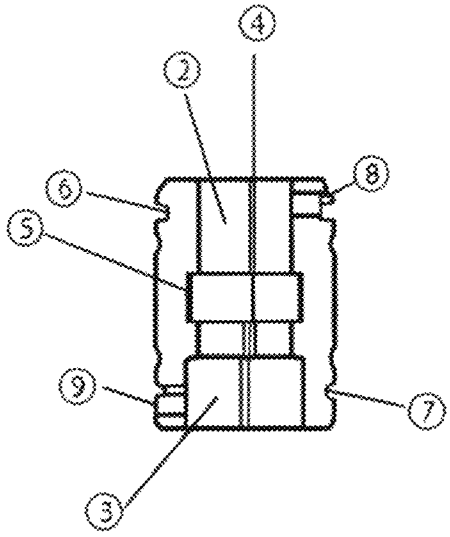
FIG. 2 is a sectional view of a socket end of a multi-functional double-ended socket and magnetic extension bar kit with C-shape retaining rings according to the present disclosure.
Figure 3:
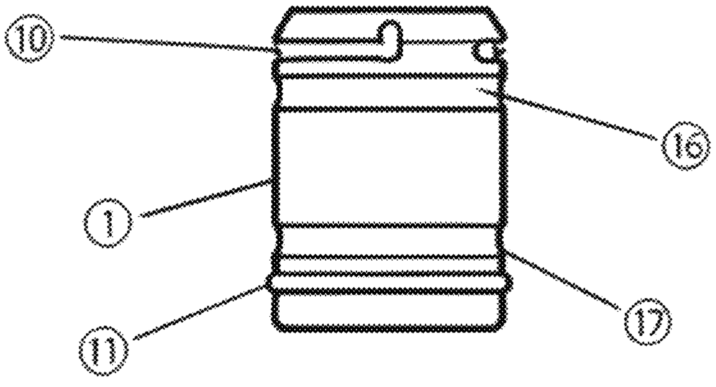
FIG. 3 is an elevation view of a socket body of a multi-functional double-ended socket and magnetic extension bar kit with C-shape retaining rings according to the present disclosure.
Figure 4:
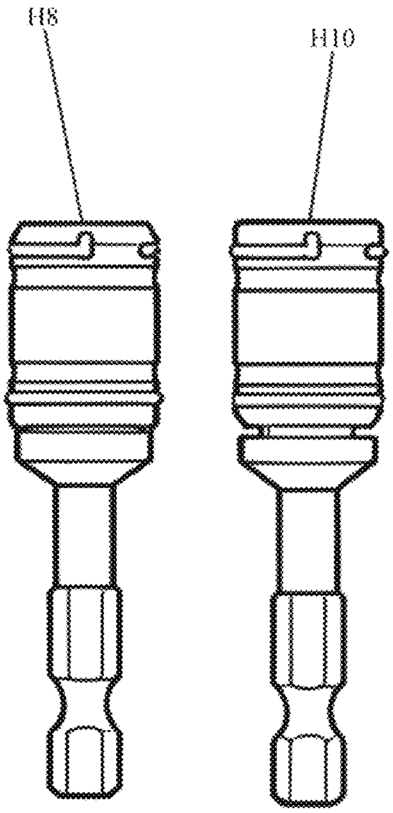
FIG. 4 is a schematic assembly view of a multi-functional double-ended socket and magnetic extension bar kit with C-shape retaining rings according to the present disclosure.
Figure 5:
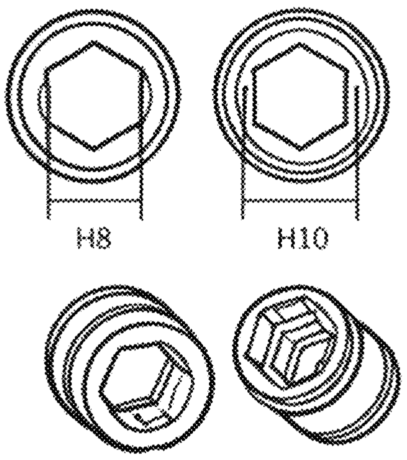
FIG. 5 is a schematic diagram of sockets of different specifications of a multi-functional double-ended socket and magnetic extension bar kit with C-shape retaining rings according to the present disclosure.
Figure 6:
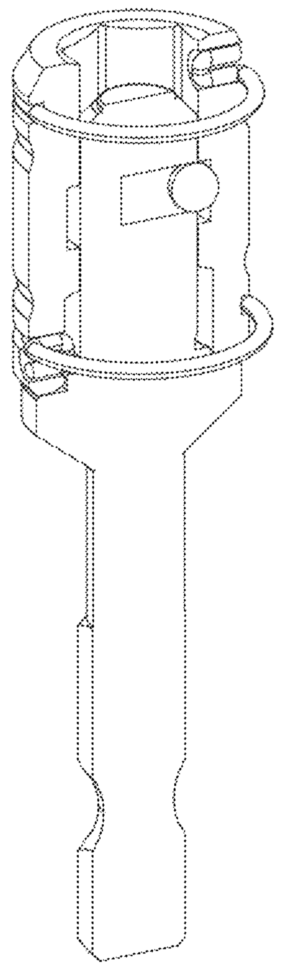
FIG. 6 is a sectional view of an assembly state of a multi-functional double-ended socket and magnetic extension bar kit with C-shape retaining rings according to the present disclosure.

This embodiment provides a multi-functional double-ended socket and magnetic extension bar kit with C-shape retaining rings, and the structure and usage are described in detail with reference to FIGS. 1-6:

I. Structural Assembly

Machining and Assembly of a Socket Body

A hollow cylindrical socket body 1 is made from chrome vanadium steel, and after a quenching and tempering heat treatment (achieving a hardness of HRC 45-50), a socket end H8 2 (with an internal specification of H8, a hexagonal opening/socket that has a size of 8 mm) and a socket end H10 3 (with an internal specification of H10, a hexagonal opening/socket that has a size of 10 mm) are integrally formed at two axial ends; a central internal hexagonal through hole H8 4 (with a specification of H8, a hexagonal hole that has a size of 8 mm) is drilled radially through two side walls in a middle portion of the socket body 1; and two H8 -end retaining ring grooves 6 are milled in a face of an internal hexagonal edge of the socket end H8 2, one H8-end retaining ring groove round hole 8 (with a diameter of larger than a width of the H8-end retaining ring groove 6) is drilled beside each H8 -end retaining ring groove 6, and an H8-end C-shape retaining ring 10 is mounted into each H8-end retaining ring groove 6. Similarly, two H10-end retaining ring grooves 7 are milled in a face of an internal hexagonal edge of the socket end H10 3, one H10-end retaining ring groove round hole 9 is drilled beside each H10-end retaining ring groove 7, and an H10-end C-shape retaining ring 11 is mounted into each H10-end retaining ring groove 7. Finally, an H8-end yellow-painted groove for specification identification 16 is formed in an outer wall of the socket body 1 corresponding to the socket end H8 2, and an H10-end blue-painted groove for specification identification 17 is formed in an outer wall of the socket body 1 corresponding to the socket end H10 3.

Assembly of a Magnetic Extension Bar

An H1/4 shank (a shank having a hexagonal shape with a ¼ inch size) of a magnetic extension bar with a detent ball 12 is machined, a mounting hole is formed at an end of the H1/4 shank distal from a tail portion, and a magnetic head 15 made from an NdFeB strong magnet (with dimensions of 5×4.5 mm) is embedded into the mounting hole through an interference fit, to ensure that an end surface of the magnetic head 15 is flush with an end surface of the H1/4 shank. A detent ball groove 5 is formed in a peripheral surface between the H1/4 shank and the magnetic head 15, and a driving end detent ball 14 is movably embedded into the detent ball groove 5. At the moment, the assembly of the magnetic extension bar with the detent ball 12 is completed.

II. Usage Modes

Operation in a Confined Space (Driving Through a Central Hole)

When an operating space is confined and use of a conventional wrench is not feasible, the H8-size internal hexagonal driving bar 13 is inserted into the central internal hexagonal through hole H8 4 from either the socket end H8 2 side or the socket end H10 3 side of the socket body 1, rotating the H8-size internal hexagonal driving bar 13 drives the socket body 1 to rotate, and a screw or nut of a corresponding specification is tightened through the socket end H8 2 or the socket end H10 3.

Assembly of a Metallic/Stainless Steel Screw (Magnetic Attraction Assistance)

The tail portion of the H1/4 shank of the magnetic extension bar with the detent ball 12 is connected to a power tool or a pneumatic tool, a metallic or stainless steel external hexagon screw is attracted and held by the magnetic head 15, the screw is aligned with an assembly hole and preliminarily tightened, and the power tool or pneumatic tool is activated to drive the socket body 1 to rotate and complete the screw tightening. In this process, the driving end detent ball 14 prevents the magnetic extension bar with the detent ball 12 from detaching from the tool.

Assembly of a Non-Metallic Screw (Clamping by a C-Shape Retaining Ring)

For a non-metallic external hexagon screw, the screw is placed into the socket end H8 2 or the socket end H10 3, and then clamped and prevented from falling off by the H8-end C-shape retaining ring 10 or the H10-end C-shape retaining ring 11 (with an opening facing a central axis of the socket body). The socket body 1 is subsequently rotated to complete the assembly. When removal of a C-shape retaining ring is necessary, the C-shape retaining ring may be taken out with the help of the H8-end retaining ring groove round hole 8 or the H10-end retaining ring groove round hole 9.

Rapid specification identification: The socket end H8 2 is quickly identified by the H8-end yellow-painted groove for specification identification 16 in the outer wall of the socket body 1, and the socket end H10 3 is quickly identified by the H10 -end blue-painted groove for specification identification 17 in the outer wall of the socket body 1, thereby preventing specification confusion.

During actual use of the device, a power tool (such as an electric screwdriver) or a pneumatic tool (such as a pneumatic wrench) from the prior art is required. The tool is connected to the tail portion of the H1/4 shank of the magnetic extension bar with the detent ball to provide a rotational power. Additionally, the chrome vanadium steel used for machining the socket body may be 50CrV4, and the S2 alloy steel may be S2 tool steel. After a quenching and tempering heat treatment, these materials better ensure the strength and wear resistance of the socket body. The NdFeB strong magnet used for the magnetic head may be an N35 grade NdFeB magnet, which is capable of providing a stable and sufficient attraction force to fix a metallic external hexagon screw or a stainless steel external hexagon screw.

Specifically, in the process of mounting the C-shape retaining rings into the retaining ring grooves, retaining ring pliers from the prior art are required. The C-shape retaining ring is spread open by jaws of the retaining ring pliers until an opening size of the retaining ring pliers matches the width of the retaining ring groove, the spread C-shape retaining ring is then aligned with the position of the retaining ring groove, and the retaining ring pliers are slowly released, allowing the C-shape retaining ring to naturally snap into the retaining ring groove to complete the installation. When the socket body is manually driven by the H8-size internal hexagonal driving bar, in case that an increased tightening torque is needed, a lever bar from the prior art may be used. The lever bar is sleeved onto an end of the H8 -size internal hexagonal driving bar distal from the socket body, and a rotational force is applied by holding both ends of the lever bar, thereby reducing a manual operation intensity and increasing a torque output. When the magnetic extension bar with the detent ball is connected to a power tool or a pneumatic tool, the tightness of a chuck of the tool must first be adjusted to ensure that an inner diameter of the chuck matches an outer diameter of the tail portion of the H1/4 shank, the tail portion of the H1/4 shank is then inserted into the chuck, and the locking function of the chuck of the tool is activated to ensure a firm and secure connection between the magnetic extension bar and the tool without looseness. In the machining process of the socket body, in addition to the quenching and tempering heat treatment, a surface anti-rust treatment process from the prior art, such as an electrogalvanizing treatment, is also required. The finished socket body is placed into a galvanizing bath, where a uniform zinc layer is formed on a surface of the socket body through an electrochemical action to enhance the corrosion resistance of the socket body. Upon completion of screw tightening, when it is necessary to check whether the fastening torque of the screw meets requirements, a torque wrench from the prior art may be used. The driving end of the torque wrench is adapted and connected to the H8-size internal hexagonal driving bar, the H8-size internal hexagonal driving bar is then inserted into the central internal hexagonal through hole H8 of the socket body, and the torque wrench is slowly rotated until a preset torque value is reached, thereby verifying whether the fastening effect of the screw meets the standard. When a screw location is deep in an operation scenario, an extension from the prior art may be used. One end of the extension is connected to the tail portion of the H1/4 shank of the magnetic extension bar with the detent ball, and the other end of the extension is connected to the power tool or pneumatic tool. The extension increases an operation distance of the tool, thereby ensuring that the magnetic head is capable of successfully contacting and attracting the deeply located screw.

Although the preferred embodiments of the present disclosure have been disclosed above, such embodiments are not intended to limit the present disclosure. Any person skilled in the art, without departing from the spirit and scope of the present disclosure, may make various variations and modifications. Therefore, the protection scope of the present disclosure should be defined by the claims.

What is claimed is:

1. A multi-functional double-ended socket and magnetic extension bar kit with C-shape retaining rings, comprising a socket body, a magnetic extension bar with a detent ball, an H8-end C-shape retaining ring, and an H10-end C-shape retaining ring; wherein the socket body is in a hollow cylindrical shape and is made from chrome vanadium steel or S2 alloy steel through a quenching and tempering heat treatment, two axial ends of the socket body are integrally formed with a socket end H8 and a socket end H10, respectively, an internal specification of the socket end H8 is H8, an internal specification of the socket end H10 is H10, and the socket end H8 and the socket end H10 are configured to tighten metallic external hexagon screws, non-metallic external hexagon screws, or external hexagon nuts of different specifications;

a central internal hexagonal through hole H8 is radially formed in a middle portion of the socket body, a specification of the central internal hexagonal through hole H8 is H8, the central internal hexagonal through hole H8 penetrates through two side walls of the socket body, and the central internal hexagonal through hole H8 is configured to receive an H8-size internal hexagonal driving bar to drive the socket body to rotate; and the magnetic extension bar with the detent ball comprises an H1/4 shank, a magnetic head, a detent ball groove, and a driving end detent ball, wherein a tail portion of the H1/4 shank is configured to connect a power tool or a pneumatic tool, to drive the socket body to rotate through the electric tool or the pneumatic tool;

the magnetic head is made from an NdFeB strong magnet with dimensions of 5×4.5 mm, and the magnetic head is fixedly mounted at an end of the H1/4 shank distal from the tail portion and configured to attract and fix a metallic external hexagon screw or a stainless steel external hexagon screw, to facilitate screw pickup/placement and initial positioning; and the detent ball groove is formed in a peripheral surface of a bar body between the H1/4 shank and the magnetic head, and the driving end detent ball is movably embedded in the detent ball groove; and two H8-end retaining ring grooves are formed in a face of an internal hexagonal edge of the socket end H8, two H10-end retaining ring grooves are formed in a face of an internal hexagonal edge of the socket end H10, a size of each H8-end retaining ring groove matches a size of the H8-end C-shape retaining ring, a size of each H10-end retaining ring groove matches a size of the H10-end C-shape retaining ring, the H8-end C-shape retaining ring is correspondingly snapped in the H8-end retaining ring groove, the H10-end C-shape retaining ring is correspondingly snapped in the H10-end retaining ring groove, and the H8-end C-shape retaining ring and the H10-end C-shape retaining ring are configured to clamp a metallic external hexagon screw, a non-metallic external hexagon screw, or a stainless steel external hexagon screw to prevent the screw from falling off;

wherein an H8-end yellow-painted groove for specification identification is formed in an outer wall of the socket end H8, an H10-end blue-painted groove for specification identification is formed in an outer wall of the socket end H10, the H8-end yellow-painted groove for specification identification is configured to intuitively identify the specification of the socket end H8, and the H10-end blue-painted groove for specification identification is configured to intuitively identify the specification of the socket end H10.

2. The multi-functional double-ended socket and magnetic extension bar kit with C-shape retaining rings according to claim 1, wherein the central internal hexagonal through hole H8 is adapted to an H8-size internal hexagonal driving bar, and the H8 -size internal hexagonal driving bar is inserted into the central internal hexagonal through hole H8 from the socket end H8 side of the socket body, or inserted into the central internal hexagonal through hole H8 from the socket end H10 side of the socket body, to achieve the socket body to be driven to rotate from either direction of both ends of the socket body.

3. The multi-functional double-ended socket and magnetic extension bar kit with C-shape retaining rings according to claim 1, wherein the driving end detent ball is configured to achieve an axial limitation when the magnetic extension bar with the detent ball cooperates with an external tool or the socket body, to prevent the magnetic extension bar with the detent ball from detaching from the cooperating component.

4. The multi-functional double-ended socket and magnetic extension bar kit with C-shape retaining rings according to claim 1, wherein one H8-end retaining ring groove round hole is correspondingly formed beside each H8-end retaining ring groove of the socket end H8, one H10-end retaining ring groove round hole is correspondingly formed beside each H10-end retaining ring groove of the socket end H10, the H8-end retaining ring groove round hole is communicated with the corresponding H8-end retaining ring groove, the H10-end retaining ring groove round hole is communicated with the corresponding H10-end retaining ring groove, diameters of the H8-end retaining ring groove round hole and the H10-end retaining ring groove round hole are larger than widths of the H8-end retaining ring groove and the H10-end retaining ring groove, respectively, and the H8-end retaining ring groove round hole and the H10-end retaining ring groove round hole are configured to assist in installation and removal operations of the H8-end C-shape retaining ring and the H10-end C-shape retaining ring.

5. The multi-functional double-ended socket and magnetic extension bar kit with C-shape retaining rings according to claim 1, wherein the magnetic head is embedded into an end portion of the H1/4 shank distal from the tail portion by an interference fit, and an end surface of the magnetic head is flush with an end surface of the H1/4 shank at the end where the magnetic head is located, to ensure a secure connection between the magnetic head and the H1/4 shank, and simultaneously prevent the magnetic head from protruding and causing interference.

6. The multi-functional double-ended socket and magnetic extension bar kit with C-shape retaining rings according to claim 1, wherein the heat treatment process of the socket body involves quenching and tempering, and the socket body treated with quenching and tempering has a hardness of up to HRC 45-50, to enhance the deformation resistance, strength, and wear resistance of the socket body, and extend the service life of the tool.

7. The multi-functional double-ended socket and magnetic extension bar kit with C-shape retaining rings according to claim 1, wherein the number of the H8-end retaining rings is consistent with the number of the H8-end retaining ring grooves, the number of the H10-end retaining rings is consistent with the number of the H10-end retaining ring grooves, and opening directions of both the H8-end C-shape retaining ring and the H10-end C-shape retaining ring face a central axis of the socket body to ensure a clamping effect on a screw.

* * * * *